(12) United States Patent
Liu et al.

(10) Patent No.: US 8,938,694 B2
(45) Date of Patent: *Jan. 20, 2015

(54) THREE-DIMENSIONAL MASK MODEL FOR PHOTOLITHOGRAPHY SIMULATION

(71) Applicant: ASML Netherlands B.V., Veldhoven (NL)

(72) Inventors: Peng Liu, Sunnyvale, CA (US); Yu Cao, Saratoga, CA (US); Luoqi Chen, Saratoga, CA (US); Jun Ye, Palo Alto, CA (US)

(73) Assignee: ASML Netherlands B.V., Veldhoven (NL)

( * ) Notice: Subject to any disclaimer, the term of this patent is extended or adjusted under 35 U.S.C. 154(b) by 0 days.

This patent is subject to a terminal disclaimer.

(21) Appl. No.: 14/081,386

(22) Filed: Nov. 15, 2013

(65) Prior Publication Data

US 2014/0195993 A1 Jul. 10, 2014

Related U.S. Application Data

(63) Continuation of application No. 13/736,929, filed on Jan. 8, 2013, now Pat. No. 8,589,829, which is a continuation of application No. 12/721,343, filed on Mar. 10, 2010, now Pat. No. 8,352,885, which is a continuation of application No. 11/838,582, filed on Aug. 14, 2007, now Pat. No. 7,703,069.

(51) Int. Cl.
*G06F 17/50* (2006.01)
*G03F 1/00* (2012.01)
*G03F 1/36* (2012.01)
*G03F 7/20* (2006.01)

(52) U.S. Cl.
CPC ............ *G06F 17/5009* (2013.01); *G03F 1/144* (2013.01); *G03F 1/36* (2013.01); *G03F 7/705* (2013.01)

USPC ................................. 716/51; 716/50; 716/106

(58) Field of Classification Search
None
See application file for complete search history.

(56) References Cited

U.S. PATENT DOCUMENTS

| 7,003,758 B2 | 2/2006 | Ye et al. |
| 7,587,704 B2 | 9/2009 | Ye et al. |
| 7,703,069 B1 | 4/2010 | Liu et al. |
| 7,921,383 B1 | 4/2011 | Wei |

(Continued)

OTHER PUBLICATIONS

Adam, et al., "Domain Decomposition Methods for the Rapid Electromagnetic Simulation of Photomask Scattering" 2002 Soc. of Photo-Optical Instrumentation Eng., J. Microlith., Microfab. Microsyst., vol. 1, No. 3, Oct. 2002, pp. 253-269.

(Continued)

*Primary Examiner* — Leigh Garbowski
(74) *Attorney, Agent, or Firm* — Pillsbury Winthrop Shaw Pittman LLP

(57) ABSTRACT

A three-dimensional mask model of the invention provides a more realistic approximation of the three-dimensional effects of a photolithography mask with sub-wavelength features than a thin-mask model. In one embodiment, the three-dimensional mask model includes a set of filtering kernels in the spatial domain that are configured to be convolved with thin-mask transmission functions to produce a near-field image. In another embodiment, the three-dimensional mask model includes a set of correction factors in the frequency domain that are configured to be multiplied by the Fourier transform of thin-mask transmission functions to produce a near-field image.

16 Claims, 9 Drawing Sheets

(56) References Cited

U.S. PATENT DOCUMENTS

| | | | |
|---|---|---|---|
| 7,921,387 B2 | 4/2011 | Wei | |
| 8,352,885 B2 | 1/2013 | Liu et al. | |
| 8,589,829 B2 | 11/2013 | Liu et al. | |
| 2005/0015233 A1 | 1/2005 | Gordon | |
| 2007/0061772 A1 | 3/2007 | Ye et al. | |

OTHER PUBLICATIONS

Adam, et al., "Simplified Models for Edge Transitions in Rigorous Mask Modeling", Optical Microlith. XIV, Proc. of SPIE, vol. 4346, 2001, pp. 331-344.

Bai, et al., "Approximation of Three Dimensional Mask Effects with Two Dimensional Features", Emerging Lithographic Tech. IX, Proc. SPIE, vol. 5751, 2005, pp. 446-454.

Born, et al., "Principles of Optics", 7th (expanded) ed., *Electromagnetic theory of Propagation, Interference and Diffraction of Light*, pp. 598-607.

Burger, et al., "Rigorous Simulation of 3D Masks", Photomask Tech. 2006, Proc. SPIE, vol. 6349, 2006, pp. 1-8.

Cao, et al., "Optimized hardware and Software for Fast, Full Chip Simulation", Proc. SPIE, vol. 5754, 2005, p. 407.

Cobb, et al., "Fast Optical and Process Proximity Correction Algorithms for Integrated Circuit Manufacturing", Ph.D. Dissertation, Univ. of California Berkeley, Spring 1998, 139 pages.

Erdmann, et al., "Mask and Wafer Topography Effects in Immersion Lithography", Optical Microlithography XVIII, Proc. SPIE, vol. 5754, 2005, pp. 383-394.

Estroff, et al., "Mask-induced Polarization Effects at High Numerical Aperture", J. Microligh, Microfab., Microsys., Jul.-Sep. 2005, vol. 4(3), pp. 031107-1 to 031107-8.

Flagello, et al., "Polarization Effects Associated with Hyper Numerical Aperture (>1) Lithography", J. Microligh, Microfab., Microsys., Jul.-Sep. 2004, 4(3), pp. 031104-1 to 031104-17.

Lam, et al., "Domain Decomposition Methods for Simulation of Printing and Inspection of Phase Defects", Optical Microlithography XVI, Proc. SPIE, vol. 5040, 2003, pp. 1492-1501.

Lee, et al., Mask Topography Effect on OPC at Hyper NA Lithography:, Optical Microlithography XIX, Proc. SPIE, vol. 6154, pp. 1-8.

Li, et al. "Metropole-3D: A Rigorous 3D Topography Simulator", SPIE, vol. 3334, pp. 717-728.

Mack, et al., "The Impact of Attenuated Phase Shift Mask Topography on Hyper-NA Lithography", 25th Annual BACUS Symp. on Photomask Tech., Proc. SPIE, vol. 5992, 2005, pp. 1-11.

Martin, et al., "Exploring New High Speed, Mask Aware RET Verification Flows", Photomask and Next Generation Lith. Mask Tech XII, Proc. SPIE, vol. 5853, 2005, pp. 114-123.

Philipsen, et al., "Mask Topography Effect in Chromeless Phase Lithography", 24th Annual BACUS Symp. on Photomask Tech., Proc. SPIE, vol. 5567, 2004, pp. 669-679.

Pistor, et al., "Modeling Oblique Incidence Effects in Photomaks", Optical Microlithography XII, Proc. of SPIE, vol. 4000, 2000, pp. 228-237.

Pistor, et al., "Rigorous 3D Simulation of Phase Defects in Alternating Phase Shifting Masks", 21st BACUS Symp. on Photomask Tech, Proc. SPIE, vol. 4562, 2002, pp. 1038-1050.

Spence, et al., "Full Chip Lithography Simulation and Design Analysis How OPC is changing IC Design", Emerging Lith. Tech. IX, Proc. SPIE, vol. 5751, 2005, pp. 1-14.

Tirapu-Azpiroz, et al., "Boundary Layer Model to Account for Thick Mask Effects in Photolithography", Optical Microlithography XVI, Proc. SPIE, vol. 5040, 2003, pp. 1611-1619.

Wong, et al., "Examination of Polarization and Edge Effects in Photolithographic Masks Using Three-Dimensional Rigorous Simulation", SPIE, vol. 2197, pp. 521-528.

Wong, et al., "Mask Topography Effects in Projection Printing of Phase Shifting Masks", IEEE Transactions on Electron Devices, vol. 41, No. 6, Jun. 1994, pp. 895-902.

Yeung, et al., "Fast and Rigorous Three-Dimensional Mask Diffraction Simulation Using Battle Lemarie Wavelet Based Multiresolution Time Domain Method", Optical Microlith XVI, Proc. SPIE, vol. 5040, 2003, pp. 69-77.

Yeung, et al., "Limitation of the Kirchoff Boundary Conditions for Aerial Image Simulation in 157-nm Optical Lithography", IEEE Electron Device Letters, vol. 21, No. 9, Sep. 2000, pp. 433-435.

Laird et al., "Optimization of an x-ray mask design for use with horizontal and vertical kinetic mounts," 1991 SPIE, vol. 1465, pp. 134-144.

Kirchauer et al., "Rigorous Three-Dimensional Photoresist Exposure and Development Simulation over Nonplanar Topography," IEEE Trans. on CAD of ICs and Systems, vol. 16, No. 12, Dec. 1997, pp. 1431-1438.

Liu et al., "Fast and accurate 3D mask model for full-chip OPC and verification," Feb. 27, 2007, Proc. of SPIE, vol. 6520, 12 pages.

Saied et al., "Three-dimensional mask effects and source polarization impact on OPC model accuracy and process window," 2007 Proc. of SPIE, vol. 6520, 12 pages.

Evanschitzky et al., "Three dimensional EUV simulations—A new mask neat field and imaging simulation system," 2005 Proc. of SPIE, vol. 5992, 9 pages.

Erdmann, "Process Optimization Using Lithography Simulation," 2003 Proc. of SPIE, vol. 5401, pp. 22-36.

Gordon, "Exact Computation of Scalar, 2D Aerial Imagery," 2002 Proc. of SPIE, pp. 517-528.

Fuard et al., "Validity of the Diffused Aerial Image Model: an Assessment Based on Multiple Test Cases," 2003 Proc. of SPIE, vol. 5040, pp. 1536-1543.

Wong et al., "Rigorous Three-Dimensional Time-Domain Finite-Difference Electromagnetic Simulation for Photolithographic Applications," IEEE Trans. on Semiconductor Manufacturing, vol. 8, No. 4, Nov. 1995, pp. 419-431.

Adam, "Modeling of Electromagnetic Effects from Mask Topography at Full-Chip Scale," 2005 Proc. of SPIE, p. 498.

Zhu et al., "Metropole-3D: A Three-Dimensional Electromagnetic Field Simulator for EUV Masks under Oblique Illumination," 2003 Proc. of SPIE, vol. 5256, pp. 585-594.

Wei et al., "3D Rigorous Simulation of Mask Induced Polarization," 2005 Proc. of SPIE, vol. 5754, pp. 567-575.

Estroff et al., "Mask induced polarization," 2004 Proc. of SPIE, vol. 5377, pp. 1069-1080.

Smaali et al., "Three-dimensional Rigorous Simulation of EUV Defective Masks Using Model Method by Fourier Expansion," 2006 Proc. of SPIE, vol. 6151, 10 pages.

THREE-DIMENSIONAL MASK MODEL FOR PHOTOLITHOGRAPHY SIMULATION

CROSS-REFERENCE TO RELATED APPLICATIONS

This application is a continuation of U.S. patent application Ser. No. 13/736,929, filed Jan. 8, 2013, now U.S. Pat. No. 8,589,829, which is a continuation of U.S. patent application Ser. No. 12/721,343, filed Mar. 10, 2010, now U.S. Pat. No. 8,352,885, which is a continuation of U.S. patent application Ser. No. 11/838,582, filed Aug. 14, 2007, now U.S. Pat. No. 7,703,069, each of which applications are incorporated herein by reference in their entirety.

FIELD OF THE INVENTION

This invention relates generally to simulating photolithography processes and relates more particularly to methods for three-dimensional mask modeling.

BACKGROUND

The integrated circuit industry has, since its inception, maintained a remarkable growth rate by driving increased device functionality at lower cost. One of the primary enabling factors of this growth has been the ability of optical lithography to steadily decrease the smallest feature size that can be formed as part of the integrated circuit pattern. The steady decline in feature size and cost and the corresponding increase in the density of features printed per circuit are commonly referred to as "Moore's Law" or the lithography "roadmap."

The lithography process involves creating a master image on a mask or reticle (mask and reticle are used interchangeably herein), then projecting an image from the mask onto a resist-covered substrate in order to create a pattern that matches the design intent of defining functional elements, such as transistor gates, contacts, etc., on the device wafer. The more times a master pattern is successfully replicated within the design specifications, the lower the cost per finished device or "chip" will be. Until recently, the mask pattern has been an almost exact duplicate of the desired pattern at the wafer level, with the exception that the mask level pattern may be several times larger than the wafer level pattern, due to an imaging reduction ratio of the exposure tool. The mask pattern is typically formed by depositing and patterning a light-absorbing material on quartz or another transparent substrate. The mask is then placed in an exposure tool known as a "stepper" or "scanner" where light of a specific exposure wavelength is directed through the mask onto the wafers. The light is transmitted through clear areas of the mask, but is attenuated by a desired amount, typically between 90 and 100%, in the areas covered by the absorbing layer. The light that passes through some regions of the mask may also be phase shifted by a desired phase angle, typically an integer multiple of 180 degrees. After being collected by the projection optics of the exposure tool, the resulting aerial image pattern is then focused onto the wafers. A light-sensitive material (photoresist or resist) deposited on the wafer surface interacts with the light to form the desired pattern on the wafer, and the pattern is then transferred into the underlying layers on the wafer to form functional electrical circuits according to well-known processes.

In recent years, the feature sizes being patterned have become significantly smaller than the wavelength of light used to transfer the pattern. This trend towards "subwavelength lithography" has resulted in increasing difficulty in maintaining adequate process margins in the lithography process. The aerial images created by the mask and exposure tool lose contrast and sharpness as the ratio of feature size to wavelength decreases. This ratio is quantified by the k1 factor, defined as the numerical aperture of the exposure tool times the minimum feature size divided by the wavelength. There is limited practical flexibility in choosing the exposure wavelength, while the numerical aperture of exposure tools is approaching physical limits. Consequently, the continuous reduction in device feature sizes requires more and more aggressive reduction of the k1 factor in lithographic processes, i.e. imaging at or below the classical resolution limits of an optical imaging system.

Methods to enable low-k1 lithography have used master patterns on the mask that are no longer exact copies of the final wafer level pattern. The mask pattern is often adjusted in terms of the size and placement of features as a function of pattern density or pitch. Other techniques involve the addition or subtraction of extra corners on the mask features ("serifs," "hammerheads," and other patterns) and the addition of other geometries that are not intended to be printed on the wafer at all. These non-printing "assist features," the sole purpose of which is to enhance the printability of the "main features," may include scattering bars, holes, rings, checkerboards or "zebra stripes" to change the background light intensity ("gray scaling"), and other structures that are well documented in the literature. All of these methods are often referred to collectively as "Optical Proximity Correction" or OPC. With decreasing k1, the magnitude of proximity effects increases dramatically. In current high-end designs, more and more device layers require OPC, and almost every feature edge requires some amount of adjustment in order to ensure that the printed pattern will reasonably resemble the design intent. The implementation and verification of such extensive OPC application is only made possible by detailed full-chip computational lithography process modeling, and the process is generally referred to as model-based OPC. (See "Full-Chip Lithography Simulation and Design Analysis—How OPC Is Changing IC Design," C. Spence, Proc. SPIE, Vol. 5751, pp. 1-14 (2005) and "Exploring New High Speed, Mask Aware RET Verification Flows," P. Martin et al., Proc. SPIE 5853, pp. 114-123, (2005)).

The mask may also be altered by the addition of phase-shifting regions which may or may not be replicated on the wafer. A large variety of phase-shifting techniques has been described at length in the literature including alternating aperture shifters, double expose masking processes, multiple phase transitions, and attenuating phase shifting masks. Masks formed by these methods are known as "Phase-Shifting Masks," or PSMs. All of these techniques to increase the normalized image log slope (NILS) at low k1, including OPC, PSM and others, are referred to collectively as "Resolution Enhancement Technologies," or RET. The result of all of these RETs, which are often applied to the mask in various combinations, is that the final pattern formed at the wafer level is no longer a simple replicate of the mask level pattern. In fact, it is becoming impossible to simply look at the mask pattern and determine what the final wafer pattern is supposed to look like. This greatly increases the difficulty in verifying that the design data is correct before the mask is made and wafers exposed, as well as verifying that the RETs have been applied correctly and the mask meets its target specifications.

The cost of manufacturing advanced mask sets is steadily increasing. Currently, the cost has already exceeded one million dollars per mask set for an advanced device. In addition, the turn-around time is always a critical concern. As a result, computer simulations of the lithography process, which assist in reducing both the cost and turn-around time, have become an integral part of semiconductor manufacturing. A fast and accurate approach has been described in U.S. Pat. No. 7,003,758, entitled "System and Method for Lithography Simulation," the subject matter of which is hereby incorporated by reference in its entirety, and is referred to herein as the "lithography simulation system."

As shown in FIG. 1, a lithography simulation process typically consists of several functional steps. First, a design layout that describes the shapes and sizes of patterns that correspond to functional elements of a semiconductor device, such as diffusion layers, metal traces, contacts, and gates of field-effect transistors, is created. These patterns represent the "design intent" of physical shapes and sizes that need be reproduced on a wafer by the lithography process in order to achieve certain electrical functionality and specifications of the final device.

As described above, numerous modifications to this design layout are required to create the patterns on the mask or reticle used to print the desired structures. A variety of RET methods are applied to the design layout in order to approximate the design intent in the actually printed patterns. The resulting "post-RET" mask layout differs significantly from the "pre-RET" design layout. Both the pre- and post-RET layouts may be provided to the simulation system in a polygon-based hierarchical data file in, e.g., the GDS or the OASIS format.

The actual mask will further differ from the geometrical, idealized, and polygon-based mask layout because of fundamental physical limitations as well as imperfections of the mask manufacturing process. These limitations and imperfections include, e.g., corner rounding due to finite spatial resolution of the mask writing tool, possible line-width biases or offsets, and proximity effects similar to the effects experienced in projection onto the wafer substrate. The true physical properties of the mask may be approximated in a mask model to various degrees of complexity as described in U.S. Pat. No. 7,587,704. Mask-type specific properties, such as attenuation, phase-shifting design, etc., need be captured by the mask model. The lithography simulation system described in U.S. Pat. No. 7,003,758 may, e.g., utilize an image/pixel-based grayscale representation to describe the actual mask properties.

One of the most important inputs to any lithography simulation system is the model for the interaction between the illuminating electric field and the mask. The thin-mask approximation is widely used in most lithography simulation systems. The thin-mask approximation, also called the Kirchhoff boundary condition, assumes that the thickness of the structures on the mask is very small compared with the wavelength and that the widths of the structures on the mask are very large compared with the wavelength. Therefore, the thin-mask approximation assumes the electro-magnetic field after mask is the multiplication of the incident field with the mask transmission function. That is, the mask transmits light in an ideal way, different regions on the mask transmit the electric field with the ideal transmittance and phase, and the transition region between different types of structures is a step function. The advantages of the thin-mask model are simple, fast, and reasonably accurate calculations for feature sizes much larger than the source wavelength.

A central part of lithography simulation is the optical model, which simulates the projection and image forming process in the exposure tool. The optical model needs to incorporate critical parameters of the illumination and projection system: numerical aperture and partial coherence settings, illumination wavelength, illuminator source shape, and possibly imperfections of the system such as aberrations or flare. The projection system and various optical effects, e.g., high-NA diffraction, scalar or vector, polarization, and thin-film multiple reflection, may be modeled by transmission cross coefficients (TCCs). The TCCs may be decomposed into convolution kernels, using an eigen-series expansion. For computation speed, the series is usually truncated based on the ranking of eigen-values, resulting in a finite set of kernels. The more kernels are kept, the less error is introduced by the truncation. The lithography simulation system described in U.S. Pat. No. 7,003,758 allows for optical simulations using a very large number of convolution kernels without negative impact on computation time and therefore enables highly accurate optical modeling. (See also "Optimized Hardware and Software for Fast, Full Chip Simulation," Y. Cao et al., Proc. SPIE Vol. 5754,407 (2005)).

Further, in order to predict shapes and sizes of structures formed on a substrate, a resist model is used to simulate the effect of projected light interacting with the photosensitive resist layer and the subsequent post-exposure bake (PEB) and development process. A distinction can be made between first-principle simulation approaches that attempt to predict three-dimensional resist structures by evaluating the three-dimensional light distribution in resist, as well as microscopic, physical, or chemical effects such as molecular diffusion and reaction within that layer. On the other hand, all "fast" simulation approaches that may allow full-chip simulation currently restrict themselves to more empirical resist models that employ as an input a two-dimensional aerial image provided by the optical model part of the simulation system. This separation between the optical model and the resist model being coupled by an aerial image is schematically indicated in FIG. 1. For simplicity, optional modeling of further processes, e.g., etch, ion implantation, or similar steps, is omitted.

Finally, the output of the simulation process will provide information on the predicted shapes and sizes of printed features on the wafer, such as predicted critical dimensions (CDs) and contours. Such predictions allow a quantitative evaluation of the lithographic printing process and on whether the process will produce the intended results.

As lithography processes entered below the 65 nm node, 4× reticles for leading-edge chip designs have minimum feature sizes smaller than the wavelength of light used in advanced exposure tools. The thin-mask approximation, however, is very inaccurate at sub-wavelength dimensions where topographic effects (also called thick-mask effects) arising from the vector nature of light become noticeable. These effects include polarization dependence due to the different boundary conditions for the electric and magnetic fields, transmission and phase error in small openings, edge diffraction (or scattering) effects or electromagnetic coupling. (See "Limitation of the Kirchhoff boundary conditions for aerial image simulation in 157 nm optical lithography," M. S. Yeung and E. Barouch, IEEE Electron Devices Letter, Vol. 21, No. 9, pp. 433-435, (2000) and "Mask topography effects in projection printing of phase-shifting masks," A. K. Wong and A. R. Neureuther, IEEE Trans. On Electron Devices, Vol. 41, No. 6, pp. 895-902, (1994)). Consequently, resource-consuming rigorous 3D electromagnetic field simulation has become necessary in aerial image formation of a thick-mask, e.g., a PSM mask. However, software that implements such rigorous 3D electromagnetic field simulation often runs extremely slow and hence is limited to extremely small areas of a chip design layout (on the order of a few square microns). Software tools in this category include "SOLID-E" from Sigma-E (Santa Clara, Calif., USA), "Prolith" from KLA-Tencor (San Jose, Calif., USA), and "EM-Suite" from Panoramic Technology (San Francisco, Calif., USA). These software tools are not viable for full-chip lithography modeling. Some efforts have been made to address mask 3D effects recently for full-chip lithography modeling. Two major approaches in the literature are the domain decomposition method (DDM) and the boundary layer model (BLM). (See "Simplified Models for EDGE Transitions in Rigorous Mask Modeling," K. Adam, A. R. Neureuther, Proc. of SPIE, Vol. 4346, pp. 331-344, (2001) and "Boundary Layer Model to Account for Thick Mask Effects in PhotoLithography," J. Tirapu-Azpiroz, P. Burchard, and E. Yablonovitch, Optical Microlithography XVI, Anthony Yen, Ed., Proc. of SPIE, Vol. 5040, pp. 1611-1619, (2003)).

The DDM is based on the idea that the near field characteristics of complex masks are equivalent to the superposition of the diffraction of other masks that comprised the original mask. A particular form of DDM, the edge-DDM, includes three steps. First, all types of edge structures that will be encountered in any mask design data are identified and for each edge structure, an electromagnetic spectrum is simulated using one of the existing rigorous 2D algorithms, e.g., Finite-Discrete-Time-Domain (FDTD) or Rigorous Coupled-Waveguide Analysis (RCWA), to generated a library. Next, original mask design data are decomposed into a set of edge structures and its corresponding electromagnetic spectrum is selected from the pre-simulated library. Finally, all selected spectra are combined based on the decomposition information to form a synthesized, approximate near electric field distribution for the original mask design data. The main advantage of edge-DDM is that it provides a simple method to simulate any arbitrary, "Manhattan" structure to an accuracy level equal to rigorous thick mask simulations with a speed that can be extended to full chip mask calculations. There are, however, two major limitations with implementing edge-DDM. First, electromagnetic cross-talk between adjacent and connecting edges will grow as mask dimension continue to shrink. These nonlinear cross-talking effects cannot be taken into account by edge-DDM because the mask structure can no longer be treated as linear combinations of scattering effects from isolated edge components. The other problem is that more high scattered orders will be collected by the imaging system when both high angle off-axis illumination and larger numerical apertures are utilized for mask inspection. (See "Domain decomposition methods for simulation of printing and inspection of phase defects," M. Lam, K. Adam, and A. Neureuther, Optical Microlithography XVI, Anthony Yen, Ed., Proc. of SPIE, Vol. 5040, pp. 1492-1501, (2003)).

Alternatively, Tirapu-Azpiroz et al. proposed the boundary layer model to alternating phase-shifting masks by adding local perturbations (in the form of local rectangular functions with adjustable width, transmission and phase) near the edges of the phase shifting region. Bai has applied the boundary layer model to effectively approximate the 3D mask effect of alternating aperture phase-shifting mask (AAPSM). (See "Approximation of Three Dimensional Mask Effects with Two Dimensional Features," M. Bai, et al., Emerging Lithographic Technologies IX, R. Scott Mackay, Ed., Proc. SPIE, Vol. 575 1, pp. 446-454, (2005)). Unlike the models relying simply on the thin-mask model, the boundary layer model incorporates topographic effects and polarization dependencies of the field transmitted by the mask and can account for nonlinear interaction effects from nearby edges. It is almost a complete empirical approach, with no first-principle components and every parameter of the boundary layer structure is based on calibration of a particular mask structure that the boundary layer is attached to.

While both methods have demonstrated some successes, their disadvantages, such as inability to take into account cross-talking effects or inability to systematically generate a mask 3D model, have limited their use to more general mask features. Furthermore, both methods are either polygon-based or edge-based approaches that are not suitable for implementing into a high-speed parallel image computing system, such as the system described in U.S. Pat. No. 7,003,758. As a result, there exists a strong need for methods to create a very fast and very accurate imaging-based 3D mask model that includes mask polarization and edge scattering effects as well as supports partially polarized illumination. Such an imaging-based 3D mask model should be easily implemented into a full-chip lithography simulation system, such as the one described in U.S. Pat. No. 7,003,758.

SUMMARY

A three-dimensional mask model of the invention provides a more realistic approximation of the three-dimensional effects of a photolithography mask with sub-wavelength features than a thin-mask model. The three-dimensional mask model is applied to mask layout data to produce a near-field image that is then input into a photolithography simulation system. The three-dimensional mask model provides better accuracy to predict patterning performance of a lithography process, to verify optical proximity corrections, or any other application of lithography simulation.

In one embodiment, the three-dimensional mask model includes a set of filtering kernels in the spatial domain that are configured to be convolved with thin-mask transmission functions to produce a near-field image. The set of filtering kernels are created using rigorous electromagnetic field simulations of light passing through a calibration mask with a known topography. The set of filtering kernels is specific to a type of mask, for example a binary mask or phase-shifting mask, but is independent of any particular mask layout.

In another embodiment, the three-dimensional mask model includes a set of correction factors in the frequency domain that are configured to be multiplied by the Fourier transform of thin-mask transmission functions to produce a near-field image. The set of correction factors are created using rigorous electromagnetic field simulations of light passing through a calibration mask with a known topography. The set of correction factors is specific to a type of mask, for example a binary mask or phase-shifting mask, but is independent of any particular mask layout.

DETAILED DESCRIPTION

Figure 1:
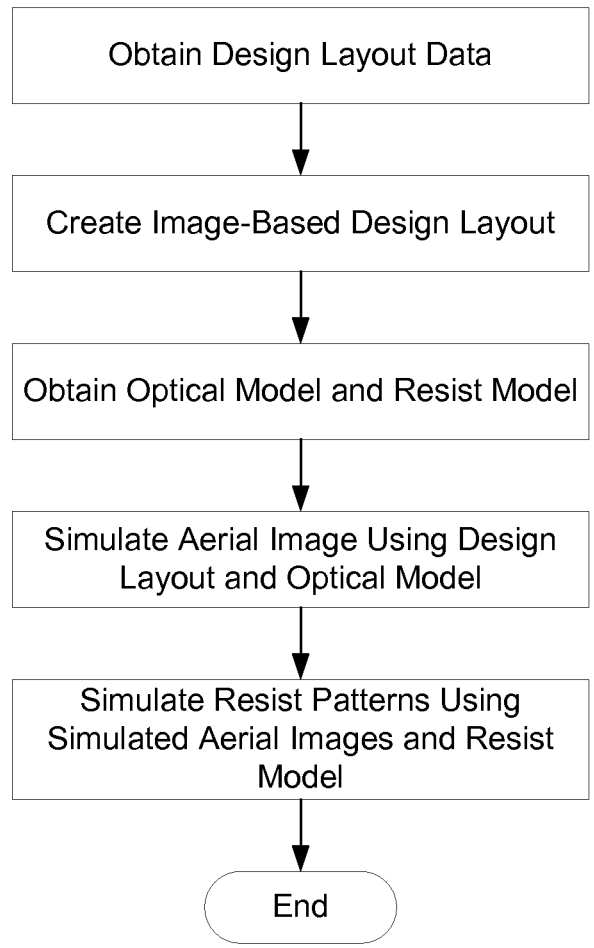
FIG. 1 is a flowchart of method steps for photolithography simulation.
Figure 2:
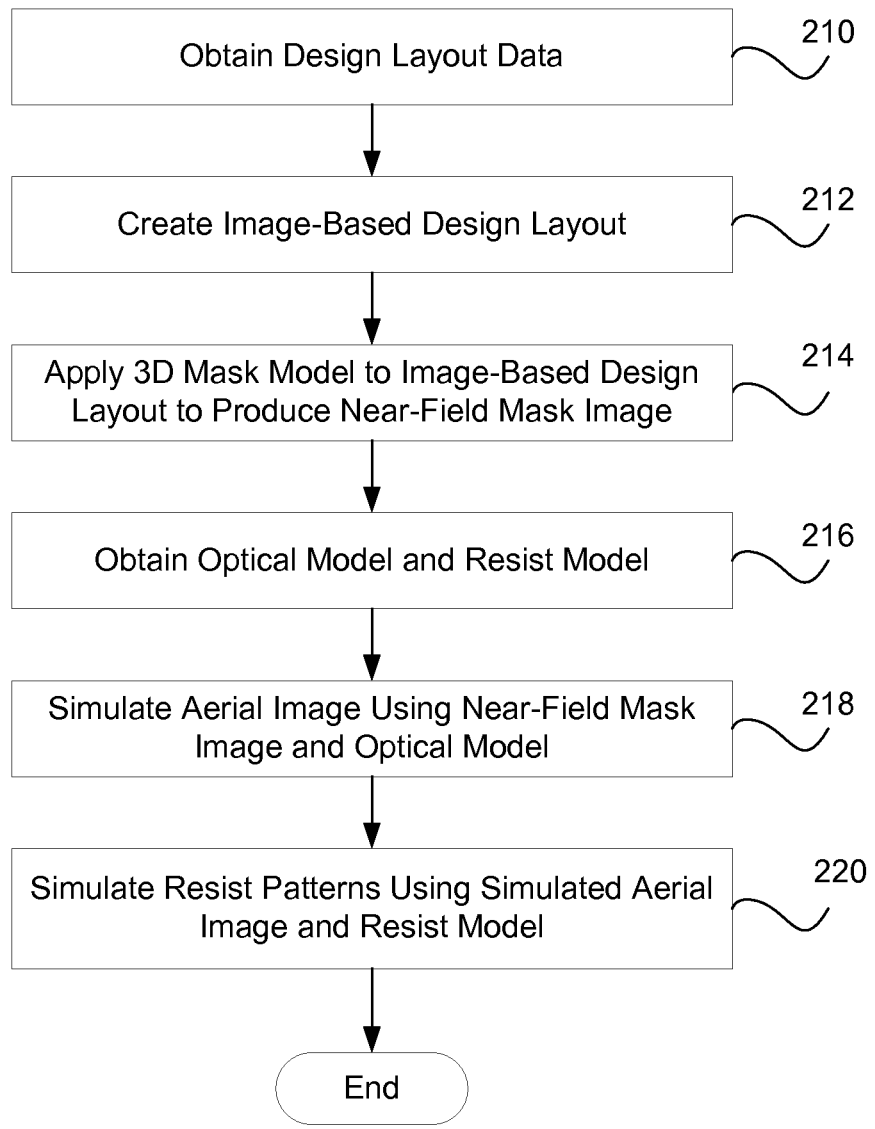
FIG. 2 is a flowchart of method steps for photolithography simulation using a 3D mask model, according to one embodiment of the invention.

FIG. 2 is a flowchart of method steps for photolithography simulation using a 3D mask model, according to one embodiment of the invention. In step 210, circuit design layout data is obtained. The circuit design data is typically in the form of a polygon-based hierarchical data file in the GDS or OASIS format. In step 212, an image-based design layout is created from the design layout data. In step 214, a three-dimensional (3D) mask model is applied to the image-based design layout to produce a near-field mask image. The 3D mask model is a representation of the effects of the three-dimensional physical structure of the mask on the projected light. A method for creating a 3D mask model is described below in conjunction with FIG. 3.

In step 216, an optical model of the exposure tool and a resist model are obtained. In step 218, an aerial image is simulated using the near-field mask image and the optical model. In step 220, the resist patterns on the wafer are simulated using the simulated aerial image and the resist model.

Figure 3:
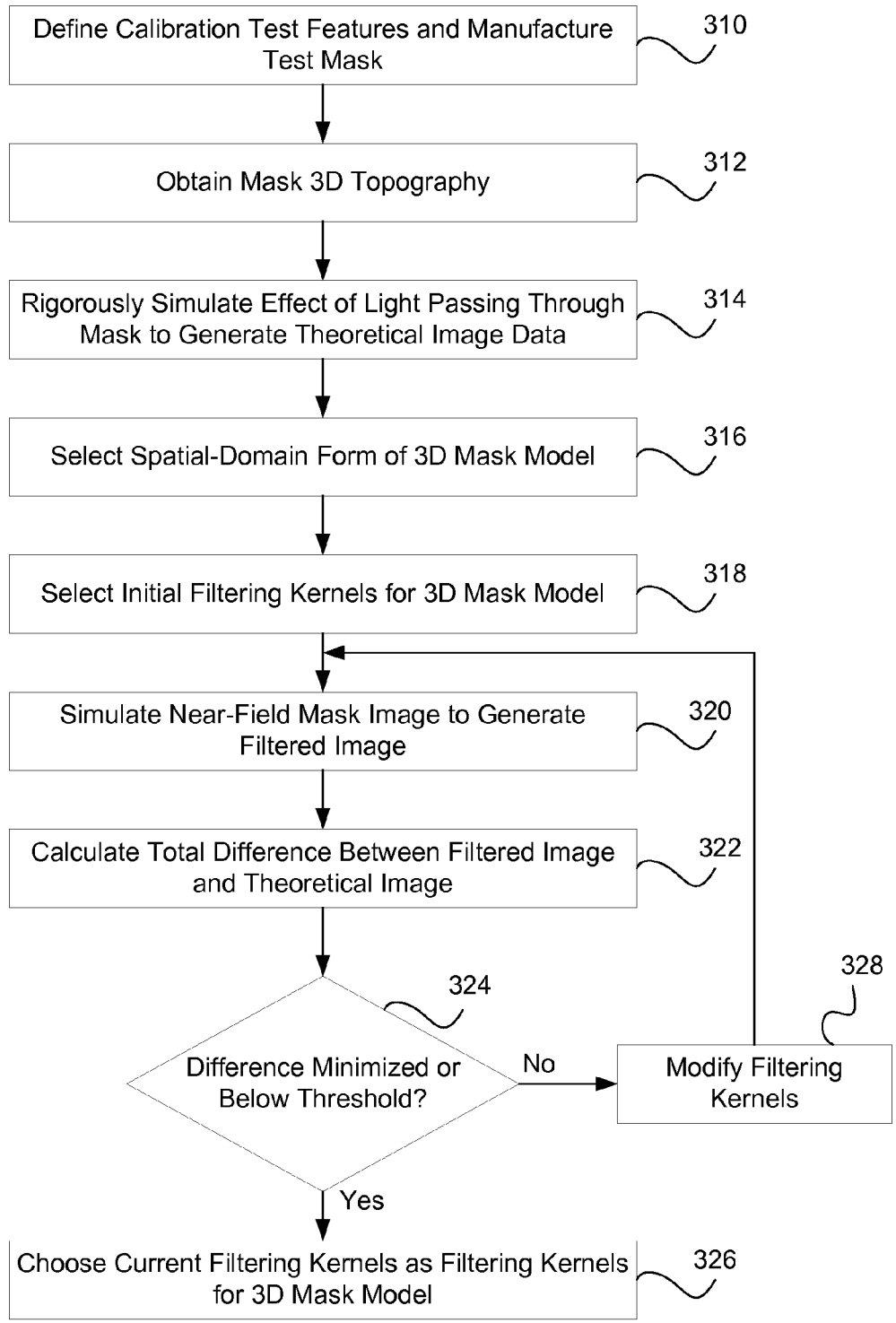
FIG. 3 is a flowchart of method steps for creating a 3D mask model, according to one embodiment of the invention.

FIG. 3 is a flowchart of method steps for creating a 3D mask model, according to one embodiment of the invention. In step 310, calibration test features are defined. The calibration test features can be imported from an existing design layout or can be specially generated for creating the 3D mask model. A test mask including the set of calibration test features is then manufactured. The calibration test features preferably cover a full range of different 3D mask topography profiles and different proximity interactions that are characteristic of the lithography process under consideration. A wide range of line/space patterns with varying pitches (from isolated to dense), and two-dimensional patterns such as line/space ends with varying gap sizes should be included. The line/space patterns span over a one-dimensional spatial frequency space while the line end patterns cover two-dimensional effects, in particular line-end pull back, pinching, etc. The test mask can be any type of optical mask, for example a chrome-on-glass binary mask or a EPSM phase-shifting mask. Each 3D mask model will be specific to a type of optical mask, although each 3D mask model is independent of the mask's layout.

In step 312, the test mask is inspected to obtain mask 3D topography data, including the thickness of films on the mask. A variety of metrology tools can be used to inspect the test mask. These metrology tools include, but are not limited to, conventional optical mask inspection tools, critical dimension scanning electron microscopes (CD-SEMs) or imaging SEMs, atomic force microscopes (AFMs) or scatterometry systems, or aerial image measurement system (AIMS) tools. The physical mask 3D topography data can also be obtained from an individual mask error model and post-OPC layout data as described in U.S. Pat. No. 7,587,704, the subject matter of which is hereby incorporated by reference in its entirety.

In step 14, the effect of light passing through the test mask is rigorously simulated using the mask 3D topography data from the test mask and well-known equations describing the behavior of light (Maxwell's equations) to generate theoretical image data. In one embodiment, the mask 3D topography data are input into a rigorous 3D electromagnetic field (EMF) solver software program and rigorous simulations of the near-field complex field distribution are obtained. The EMF solver software can use any rigorous electromagnetic field algorithm, for example, a Finite-Discrete-Time-Domain (FDTD) algorithm or a Rigorous-Coupled Waveguide Analysis (RCWA) algorithm. The simulations typically assume that the light passing through the mask is a single plane wave. Different polarization conditions are applied to the rigorous simulations, for example, x-polarization and y-polarization or TE-polarization and TM-polarization. Any other polarization condition can be represented by a linear combination of x- and y-polarizations or TE and TM polarizations.

Figure 5A:
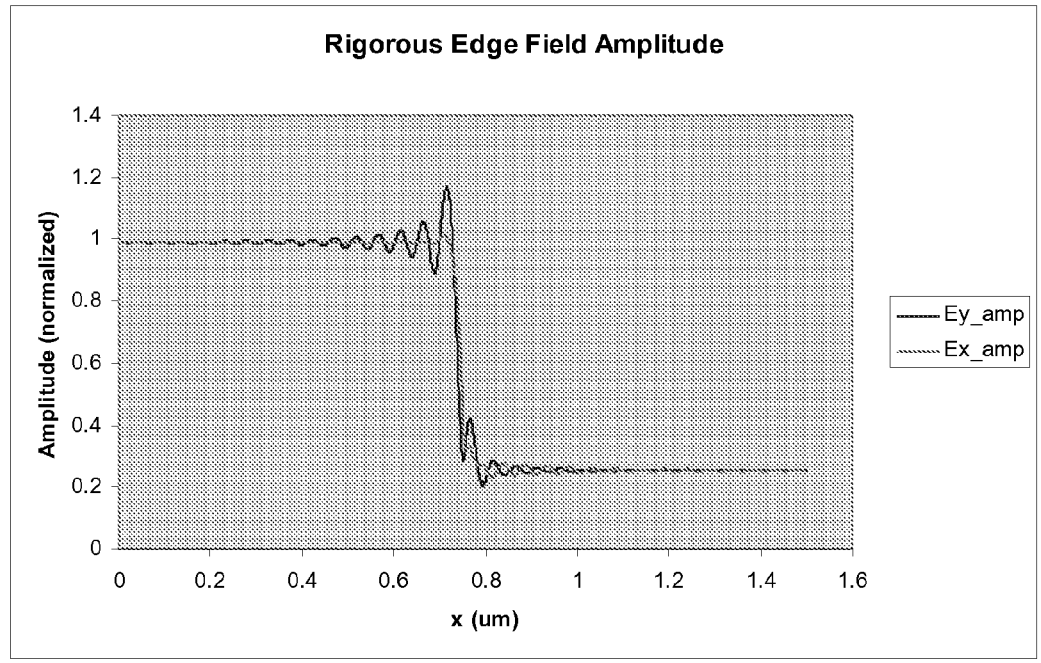
FIG. 5A is a cross-section plot of a rigorously simulated near-field amplitude distribution of a mask edge step.
Figure 5B:
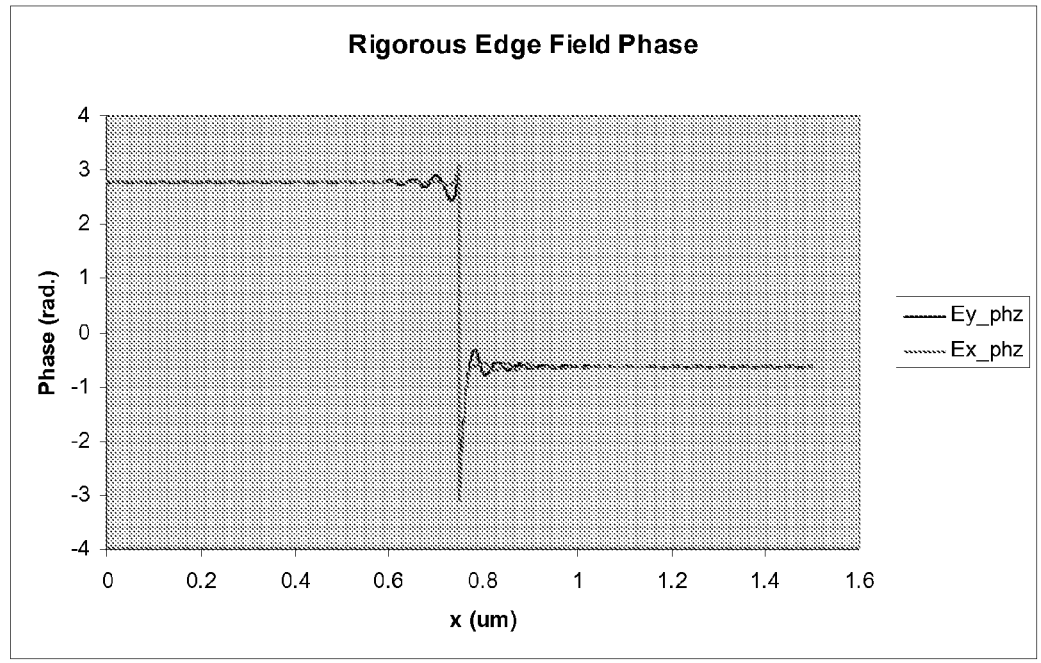
FIG. 5B is a cross-section plot of a rigorously simulated near-field phase distribution of a mask edge step.

FIGS. 5A and 5B show exemplary cross-section plots of the rigorous simulated near-field amplitude and phase responses of an EPSM phase-shifting mask edge step with x and y polarized illuminations, respectively.

Returning to FIG. 3, in step 316, a spatial-domain form of a 3D mask model is selected. In the FIG. 3 embodiment, the form of the 3D mask model is in the spatial domain, and in another embodiment shown in FIG. 4, the form of the 3D mask model is in the frequency domain. The spatial-domain form of the image-based 3D mask model consists of a set of calibrated complex filtering kernels. In step 318, initial filtering kernels for the 3D mask model are selected. Due to the mask 3D edge scattering effects and the cross-talk between close edges, the near-field electric distribution is no longer symmetric around the edge step. In order to approximate an arbitrary non-symmetric edge function, the near-field electric distribution computed from the rigorous simulation is decomposed into odd and even components, modeled by linear and bilinear filtering kernels, respectively. For the spatial-domain form of the 3D mask model, the near-field electric distribution with real mask 3D effects considered is modeled by the following:

$$M3_x = M \otimes T_x + \left(\frac{dM}{dx}\right)^2 \otimes T_{xx} + \left(\frac{dM}{dy}\right)^2 \otimes T_{xy} \quad (1)$$

$$M3_y = M \otimes T_y + \left(\frac{dM}{dx}\right)^2 \otimes T_{yx} + \left(\frac{dM}{dy}\right)^2 \otimes T_{yy} \quad (2)$$

where M3x and M3y are the complex near-field Ex and Ey field output with mask 3D effects considered (the filtered image), M is the image of the mask design layout, $$\left(\frac{dM}{dx}\right)^2$$

is to produce a kind of "positive" pulse at feature edges, and Tx, Txx, and Txy are filtering kernels that need to be calibrated. All operations are based on gray-level images. Due to physical symmetry requirements, Tx and Ty are 90 degree rotations of each other, Txx and Tyy are 90 degree rotations of each other, and Txy and Tyx are 90 degree rotations of each other. Therefore, if the filtering kernels for M3x are calibrated, there is no need to calibrate filtering kernels for M3y. In step 320, the mask near-field images are simulated by convolving the mask layout image and its derivative with the filtering kernels, Tx, Txx, and Txy according to Eqs. 1 and 2 to produce a filtered image.

In step 322, a total difference between the filtered image and the theoretical image is calculated to calibrate the filtering kernels of the 3D mask model, Tx, Txx, and Txy toward the rigorous 3D simulation results. In step 324, if the total difference between the filtered image and the theoretical image is minimized or below a predetermined threshold, the method continues with step 326. If the total difference between the filtered image and the theoretical image is not minimized or below the predetermined threshold, the method continues with step 328. In step 328 the filtering kernels Tx, Txx, and Txy are modified. The method then returns to step 320, and steps 320,322,324, and if needed, step 328 are repeated until the total difference between the filtered image and the theoretical image is minimized or below the predetermined threshold. In step 326, the current filtering kernels are chosen as the final filtering kernels for the 3D mask model.

Figure 6A:
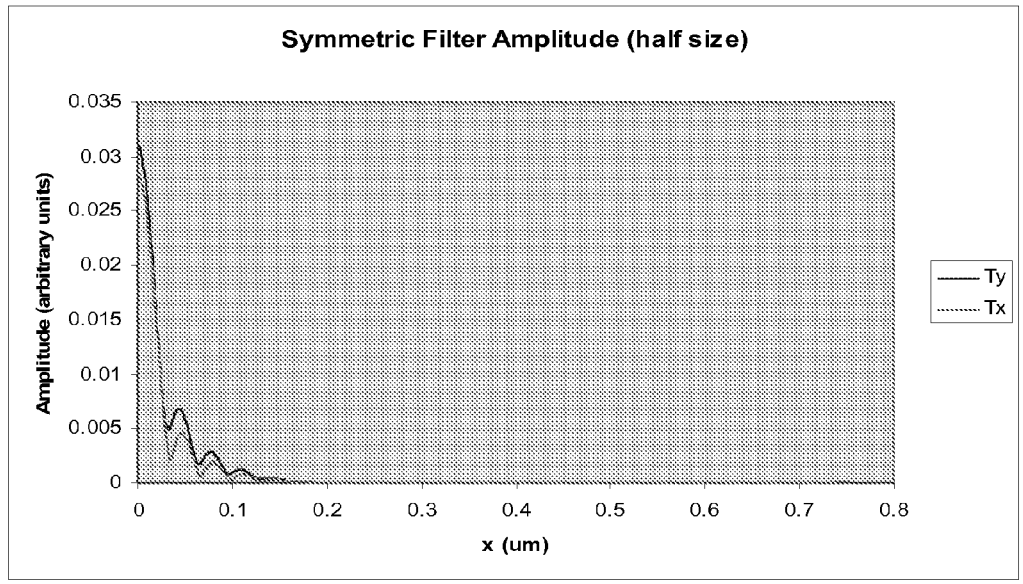
FIG. 6A is a cross-section plot of the amplitude of linear filtering kernels of a 3D mask model, according to one embodiment of the invention.
Figure 6B:
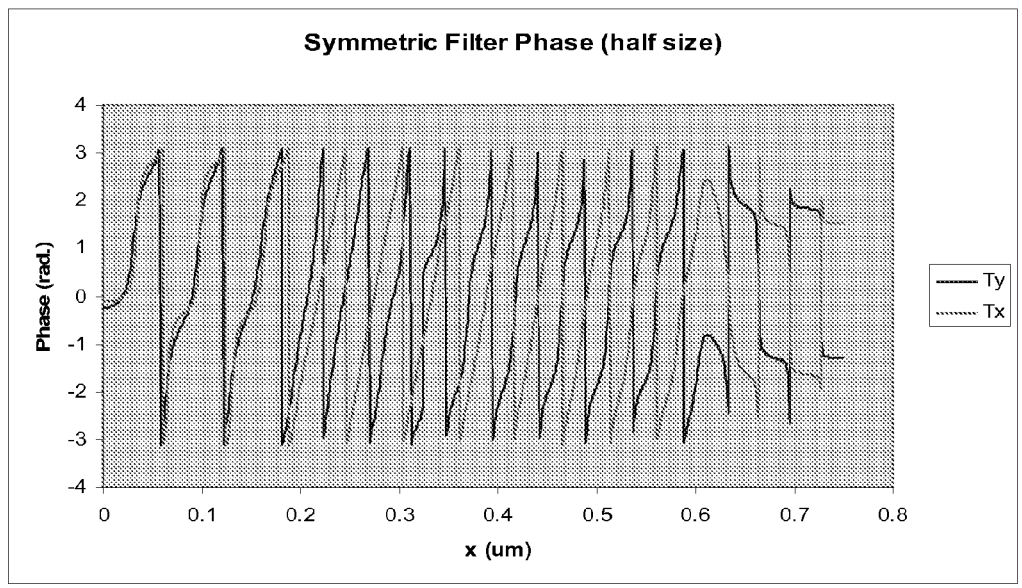
FIG. 6B is a cross-section plot of the phase of linear filtering kernels of a 3D mask model, according to one embodiment of the invention.
Figure 6C:
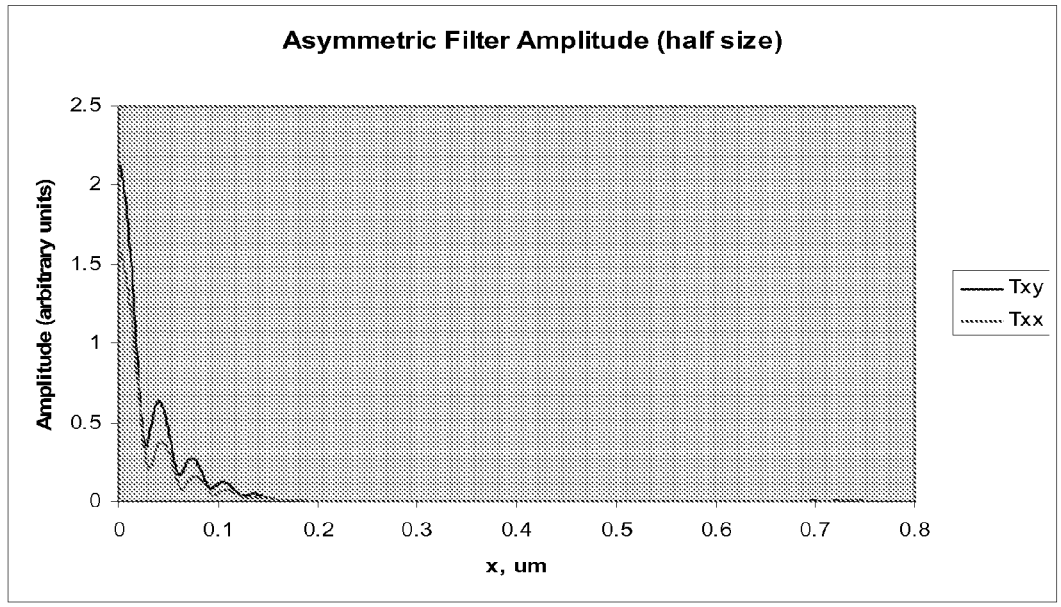
FIG. 6C is a cross-section plot of the amplitude of bilinear filtering kernels of a 3D mask model, according to one embodiment of the invention.
Figure 6D:
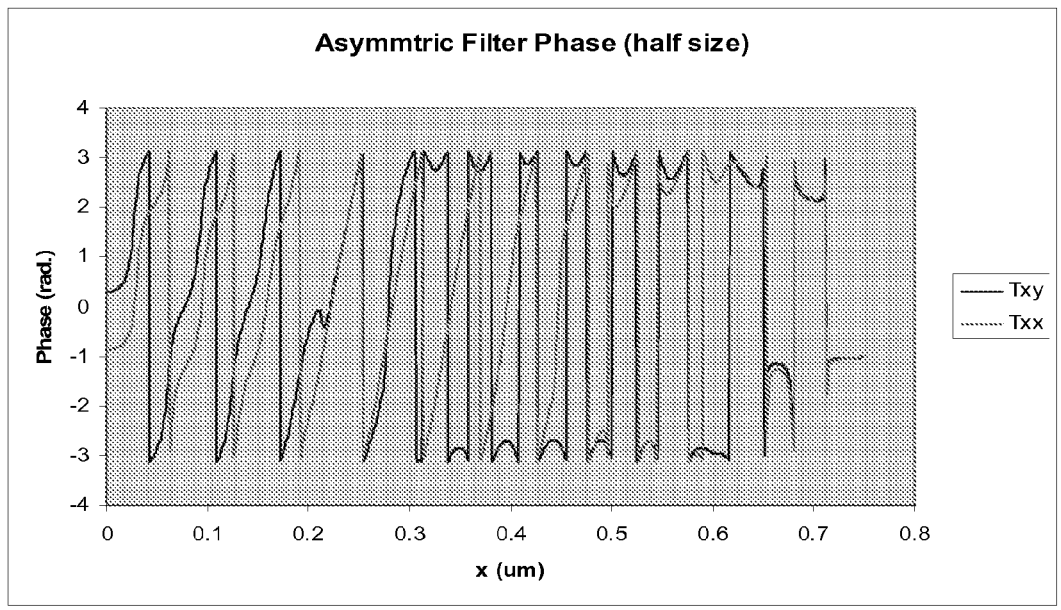
FIG. 6D is a cross-section plot of the phase of bilinear filtering kernels of a 3D mask model, according to one embodiment of the invention.

FIGS. 6A and 6B show cross-section plots of the amplitude and phase of the symmetric filtering kernels, Tx and Ty, calibrated from the rigorous near-field electric distributions shown in FIGS. 5A and 5B for an EPSM mask. FIGS. 6C and 6D show cross-section plots of the amplitude and phase of the asymmetric filtering kernels, Txx and Txy, calibrated from the rigorous near-field electric distributions shown in FIGS. 5A and 5B.

In another embodiment, the spatial-domain form of the 3D mask model is represented by Eqs. 3 and 4, which use the combination of linear and bilinear kernels as in Eqs. 1 and 2 but does not require the calculation of mask image derivative, $$\left(\frac{dM}{dx}\right) \text{ and } \left(\frac{dM}{dx}\right),$$

to model the mask transform:

$$M3_x = M \otimes T_x + a_{xx} * |M \otimes T_{xx}|^2 + a_{xy} * |M \otimes T_{xy}|^2 \quad (3)$$

$$M3_y = M \otimes T_y + a_{yx} * |M \otimes T_{yx}|^2 + a_{yy} * |M \otimes T_{yy}|^2 \quad (4)$$

The symmetry properties for the filtering kernels, Tx, Txx, Txy, are the same as in Eqs. 1 and 2, where square of derivatives are used. All filtering kernels are also x and y flip symmetric.

As shown in Eqs. 3 and 4, M3x computed from rigorous simulation can be decomposed into odd and even components, modeled by linear and bilinear kernels, respectively. The a coefficients are constants that may be complex.

A further optimization of the spatial-domain form of the 3D mask model is to combine Txx and Txy into one bilinear kernel. The benefit of this approach is not so much in speed, but in form and rotational properties. A combined bilinear kernel has enough degrees of freedom to accommodate many calibration patterns.

Figure 4:
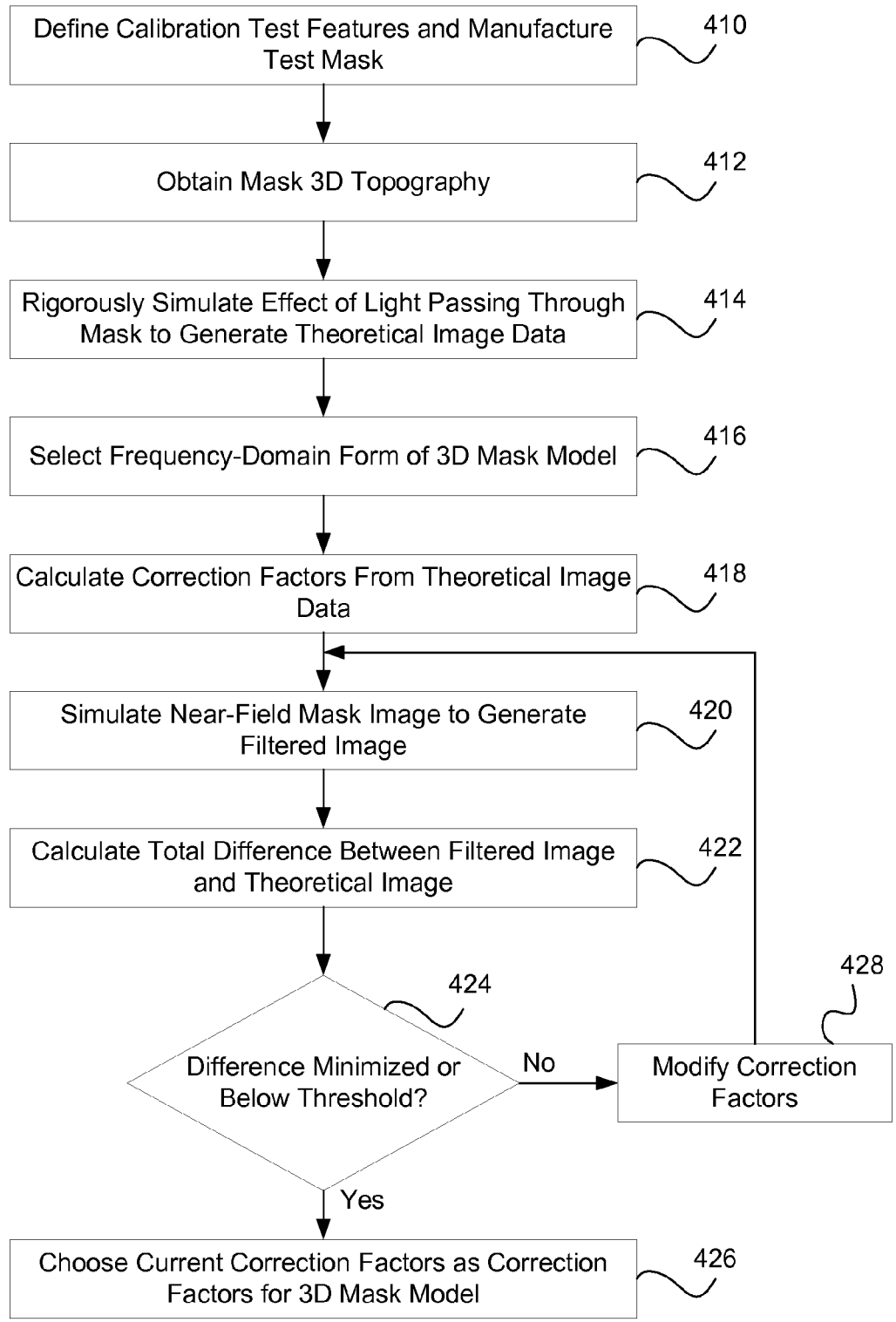
FIG. 4 is a flowchart of method steps for creating a 3D mask model, according to another embodiment of the invention.

FIG. 4 is a flowchart of method steps for creating a 3D mask model, according to one embodiment of the invention. In step 410, calibration test features are defined. In step 412, the test mask is inspected to obtain mask 3D topography data, including the thickness of films on the mask. In step 414, the effect of light passing through the test mask is rigorously simulated using the mask 3D topography data from the test mask and well-known equations describing the behavior of light to generate theoretical image data.

In step 416, a frequency-domain form of the 3D mask model is selected. The frequency-domain form of the 3D mask model has a compact mathematical representation and is capable of modeling corner scattering effects and feature-to-feature interactions. The frequency-domain form of the 3D mask model also takes into account the non-Hopkins oblique incidence effects of a mask.

The frequency-domain form of the 3D mask model for a given mask layout represents the Fourier transform of the mask's transmitted electromagnetic field:

$$t_{3D}(\vec{f}) = c(\vec{f})t(\vec{f}) + c_H(\vec{f})t_H(\vec{f}) + c_V(\vec{f})t_V(\vec{f}) + c_C(\vec{f})t_C(\vec{f}) \quad (5)$$

where $t(\vec{f})$=Fourier transform of the original thin mask transmission function, $t_H(\vec{f})$=Fourier transform of the horizontal edge function, $t_V(\vec{f})$=Fourier transform of the vertical edge function, $t_C(\vec{f})$=Fourier transform of the corner function, and $\vec{f} = (f_x, f_y)$=spatial frequencies.

The coefficients $c(\vec{f})$, $c_H(\vec{f})$, $c_V(\vec{f})$ and $c_C(\vec{f})$ are correction factors that modify the thin-mask transmission function into a thick-mask transmission function. The correction factors are also a function of polarization and incident angle, although not explicitly shown in Eq. 5. The correction factors are also dependent on the mask topography determined in step 412.

In step 418, the correction factors are calculated from the theoretical image data obtained from rigorous simulations. In step 420, the near-field mask image is simulated using the 3D mask model to generate a filtered image. In step 422, a total difference between the filtered image and the theoretical image is calculated to calibrate the correction factors of the 3D mask model toward the rigorous 3D simulation results. In step 424, if the total difference between the filtered image and the theoretical image is minimized or below a predetermined threshold, the method continues with step 426. If the total difference between the filtered image and the theoretical image is not minimized or below the predetermined threshold, the method continues with step 428. In step 428 the correction factors are modified. The method then returns to step 420, and steps 420,422,424, and if needed, step 428 are repeated until the total difference between the filtered image and the theoretical image is minimized or below the predetermined threshold. In step 426, the current correction factors are chosen as the final correction factors for the 3D mask model.

Two embodiments of the frequency-domain form of the 3D mask model include oblique incidence effects in 3D masks within the framework of Hopkins's TCC method. The first embodiment includes no additional approximations, but using it requires substantial changes to the optical model of the lithography process originally developed using a thin mask model. The second embodiment includes an additional approximation, but using it requires almost no change to the existing lithography simulation process and still offers improved accuracy over Hopkins's treatment of oblique incidence.

In the first embodiment, the wafer image can be written in the following general form.

$$\vec{I}(x) = \sum_{\vec{f}'',\vec{f}',\vec{f}_{inc},pol} S_{pol}(\vec{f}_{inc}) t_{3D,pol}(\vec{f}', \vec{f}_{inc}) \quad (6)$$

$$t^*_{3D,pol}(\vec{f}'', \vec{f}_{inc}) \vec{P}_{pol}(\vec{f}', \vec{f}_{inc}) \cdot \vec{P}^*_{pol}(\vec{f}'', \vec{f}_{inc}) e^{2\pi j (\vec{f}' - \vec{f}'') \vec{x}}$$

where pol=polarization (the summation is over orthogonal components), $\vec{f}_{inc}$=incident planewave spatial frequency, $S_{pol}(\vec{f}_{inc})$=source intensity, $\vec{P}_{pol}(\vec{f})$=generalized pupil function including all optical effects of the projection system.

It is assumed/approximated that an image produced by an illumination having a degree of polarization less than 100% can be modeled as an incoherent weighted sum of images produced by two orthogonal near fields at the mask. Substituting Eq. 5 into Eq. 6 produces $$I(\vec{x}) = \sum_{\vec{f}',\vec{f}'',\alpha,\beta} t_\alpha(\vec{f}') t^*_\beta(\vec{f}'') TCC_{\alpha\beta}(\vec{f}', \vec{f}'') e^{2\pi j(\vec{f}' - \vec{f}'') \vec{x}}, \quad (7)$$

where $$t_\alpha(\vec{f}) \text{ or } t_\beta(\vec{f}) = t(\vec{f}), t_H(\vec{f}), t_V(\vec{f}) \text{ or } t_C(\vec{f}) \quad (8)$$

$$TCC_{\alpha\beta}(\vec{f}', \vec{f}'') = \sum_{\vec{f}_{inc},pol} S_{pol}(\vec{f}_{inc}) c_{\alpha,pol}(\vec{f}', \vec{f}_{inc}) \quad (9)$$

$$c^*_{\beta,pol}(\vec{f}'', \vec{f}_{inc}) \vec{P}_{pol}(\vec{f}', \vec{f}_{inc}) \cdot \vec{P}^*_{pol}(\vec{f}'', \vec{f}_{inc})$$

Three-dimensional thick mask scattering effects and oblique incidence effects are included in the transmission cross-coefficients (TCCs) of the optical model, and there are two kinds of TCCs in Eq. 9. The first is Hermitian where $\alpha=\beta$, and the other is non-Hermitian where $\alpha \neq \beta$. For terms having Hermitian TCC's, the method of classical sum of coherent systems can be used to compute their image contributions. For non-Hermitian terms, an eigen-decomposition can be done on the system but will produce two sets of eigenvectors—left and right eigenvectors, with left eigenvectors orthogonal to right eigenvectors and vice versa. Therefore, each term's image contribution can be written as a sum of generalized coherent systems. (Each "generalized coherent system" gives rise to a pseudo-intensity distribution equal to the product of "left" and "right" amplitudes. These amplitudes are the result of the mask convolved with "left" and "right" complex filters, and are different from each other.) Although each individual term $\alpha\beta$ ($\alpha \neq \beta$) is generally complex, it always has a counter part (obtained by exchanging index a and P) which is its complex conjugate. Therefore the total image is always real.

If $t_H(\vec{f}), t_V(\vec{f})$ and $t_C(\vec{f})$ are viewed as perturbations to the thin mask, then for first order approximation their cross terms are kept with the thin mask $f(\vec{f})$. Keeping the second order terms (cross terms between $t_H(\vec{f})$, $t_V(\vec{f})$ and $t_C(\vec{f})$) allows for capture of feature-to-feature interactions due to 3D scattering.

In the second embodiment of the frequency-domain form of the 3D mask model including oblique incidence effects, Eq. 6 is approximated using an effective transmission function $\tilde{t}_{3D}(\vec{f})$:

$$\tilde{I}(\vec{x}) = \sum_{\vec{f}'',\vec{f}''',\vec{f}_{inc},pol} S_{pol}(\vec{f}_{inc}) \tilde{t}_{3D}(\vec{f}') \quad (10)$$

$$\tilde{t}^*_{3D}(\vec{f}'') \vec{P}_{pol}(\vec{f}', \vec{f}_{inc}) \cdot \vec{P}^*_{pol}(\vec{f}'', \vec{f}_{inc}) e^{2\pi j(\vec{f}' - \vec{f}'') \vec{x}}.$$

Once the effective transmission function is obtained, the wafer image can be simulated using existing lithography simulation systems designed for a thin mask model without any changes. Accordingly, Eq. 5 becomes $$\tilde{t}_{3D}(\vec{f}) = \tilde{c}(\vec{f}) t(\vec{f}) + \tilde{c}_H(\vec{f}) t_H(\vec{f}) + \tilde{c}_V(\vec{f}) t_V(\vec{f}) + \tilde{c}_C(\vec{f}) t_C(\vec{f}) \quad (11)$$

The key to this embodiment is finding the effective transmission function $\tilde{t}_{3D}(\vec{f})$, or equivalently, the effective correction factors $\tilde{c}(\vec{f}), \tilde{c}_H(\vec{f}), \tilde{c}_V(\vec{f})$ and $\tilde{c}_C(\vec{f})$ in Eq. 11, such that the difference between the approximation, Eq. 10, and the true image, Eq. 6, is minimized. The problem becomes similar to an inverse lithography problem. It is reasonable to assume that the effective transmission function is in the neighborhood of the transmission function of normal incidence otherwise the result may not be physical. Therefore a gradient method combined with a linear programming technique can be used to solve the inverse problem. In this embodiment, effects from a plane wave and oblique waves are included in the rigorous simulations used to determine the initial effective correction factors.

Figure 7:
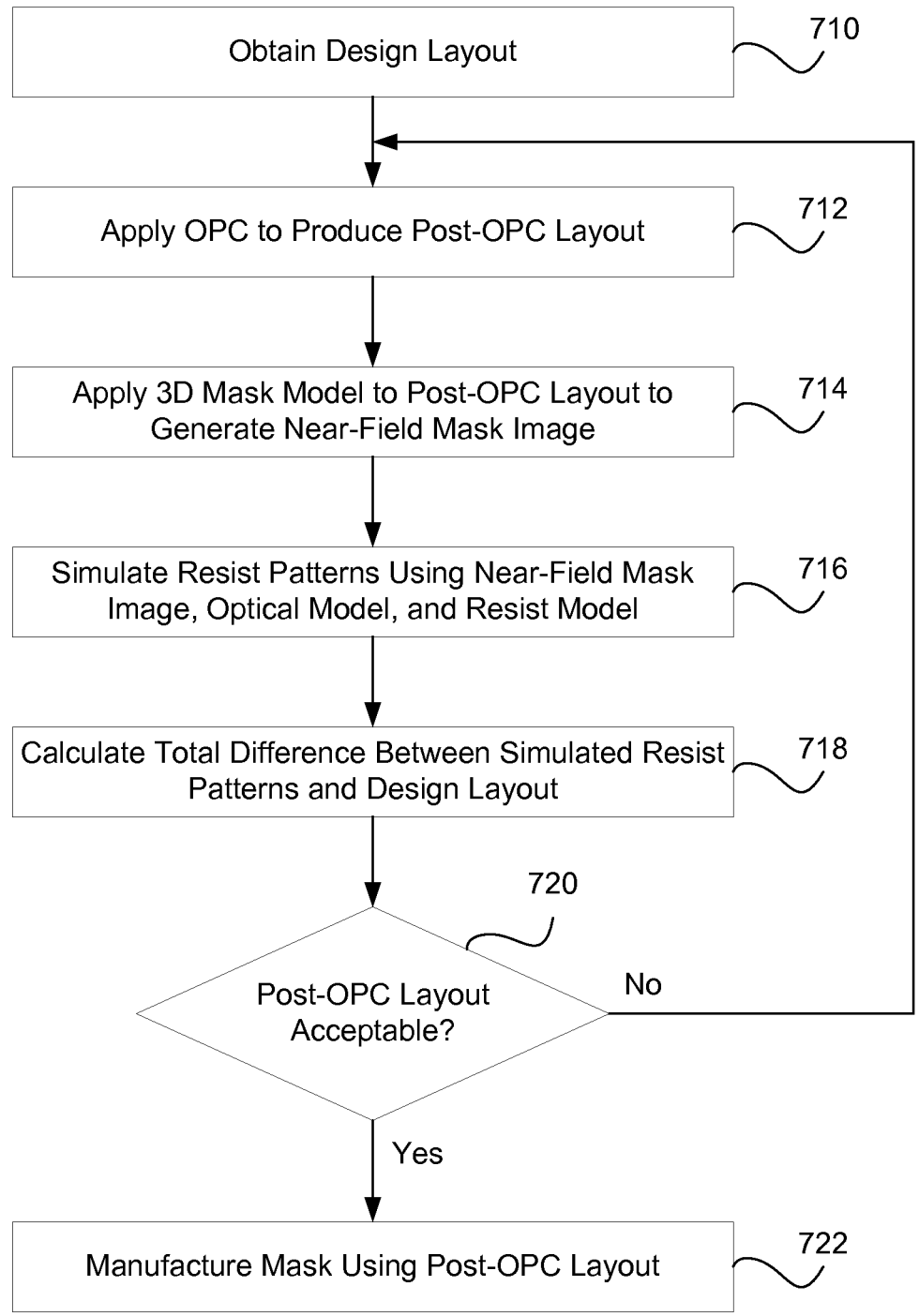
FIG. 7 is a flowchart of method steps for implementing OPC using a 3D mask model, according to one embodiment of the invention.

FIG. 7 is a flowchart of method steps for implementing OPC using a 3D mask model, according to one embodiment of the invention. In step 710, a design layout is obtained. In step 712, optical proximity corrections and optionally other RETs are applied to the design layout to produce a post-OPC mask layout. In step 714, a 3D mask model is applied to the post-OPC layout to generate a near-field mask image. The 3D mask model used should correspond to the type of mask (e.g., binary mask or phase-shifting mask) that will be manufactured. In step 716, resist patterns for the full chip are simulated using the near-field mask image generated using the 3D mask model, an optical model, and a resist model. In another embodiment, the optical model and the resist model can be replaced with a combined model that has optical and resist model components. An exemplary system and method for simulating a lithography process is disclosed in "System and Method for Lithography Simulation," U.S. Pat. No. 7,003,758, the subject matter of which is hereby incorporated by reference in its entirety. In step 718, a total difference between the simulated resist patterns and the pre-OPC design layout is calculated. In step 720, the total difference is evaluated to determine if the wafer pattern distortions caused by mask 3D effects is acceptable. The total difference may be evaluated by comparison with a threshold value or by determining if the total difference is minimized. If the post-OPC layout is acceptable, the method continues with step 722; if not, the method returns to step 712, where the total difference will be used to tune the post-OPC mask layout to produce a new post-OPC mask layout, and then the method continues until the post-OPC layout is acceptable. Once the simulated resist patterns are determined to be acceptable, then in step 722 a mask is manufactured according to the acceptable post-OPC mask layout.

Figure 8:
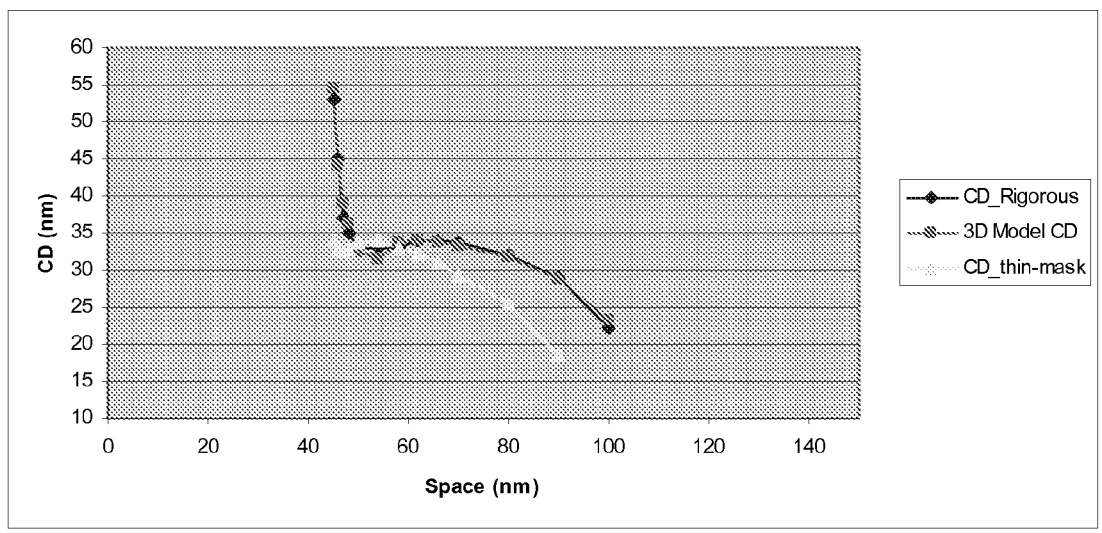
FIG. 8 is a diagram showing predictions of critical dimensions on a wafer using rigorous simulations, simulations using a thin-mask model, and simulations using a 3D mask model of the invention.

In computational lithography simulation, the output of the simulation process will provide information on the predicted shapes and sizes of printed features on the wafer, such as predicted critical dimensions (CDs) and contours. Such predictions allow a quantitative evaluation of the lithographic printing process and on whether the process will produce the intended results. Therefore, accurate CD predictions highly depend on the accuracy of the models used in the lithography simulation. The image-based 3D mask model provides more accurate CD prediction that a conventional thin-mask model. FIG. 8 is a diagram showing predictions of critical dimensions on a wafer using rigorous simulations, simulations using a thin-mask model, and simulations using a 3D mask model of the invention. The CDs predicted at various pitches using the 3D mask model are much closer to the rigorously simulated values than the CDs predicted using the thin-mask model. The 3D mask model of the invention will improve the predictive results from any application of lithography simulation because the 3D mask model provides a better approximation of a real mask than any thin-mask model.

The invention has been described above with reference to specific embodiments. It will, however, be evident that various modifications and changes may be made thereto without departing from the broader spirit and scope of the invention as set forth in the appended claims. The foregoing description and drawings are, accordingly, to be regarded in an illustrative rather than a restrictive sense.

What is claimed is:

1. A method implemented by a computer for creating a three-dimensional mask model, the method comprising:
    identifying features to include in a mask for which the three-dimensional mask model is to be created;
    simulating the effect of light passing through the mask having the identified features using three-dimensional mask topography information to produce a theoretical image;
    determining initial filtering kernels for the three-dimensional mask model using the theoretical image; and
    modifying the initial filtering kernels until a total difference between the theoretical image and a simulated image is minimized or below a threshold to produce final filtering kernels,
    wherein the final filtering kernels are configured to be convolved with one or more mask transmission functions to produce a near-field image, and wherein the simulating, determining and modifying steps are implemented using the computer.

2. The method of claim 1, wherein the mask transmission functions include one or more of a standard thin-mask transmission function and derivatives of the standard thin-mask transmission function.

3. The method of claim 1, wherein the final filtering kernels include a linear filtering kernel and at least one bilinear filtering kernel.

4. The method of claim 1, wherein the three-dimensional mask topography information was produced by inspecting a manufactured calibration mask having the identified features.

5. The method of claim 1, wherein simulating the effect of light passing through a mask includes simulating a plane wave of light and oblique waves of light passing through the mask.

6. A method implemented by a computer for creating a three-dimensional mask model, the method comprising:
    identifying features to include in a mask for which the three-dimensional mask model is to be created;
    simulating the effect of light passing through the mask having the identified features using three-dimensional mask topography information to produce a theoretical image;
    determining initial correction factors for the three-dimensional mask model using the theoretical image; and
    modifying the initial correction factors until a total difference between the theoretical image and a simulated image is minimized to produce final correction factors,
    wherein the final correction factors are configured to be multiplied by a Fourier transform of one or more mask transmission functions to produce a near-field image, and wherein the simulating, determining and modifying steps are implemented using the computer.

7. The method of claim 6, wherein the three-dimensional mask topography information was produced by inspecting a manufactured calibration mask having the identified features.

8. The method of claim 6, wherein simulating the effect of light passing through a mask includes simulating a plane wave of light and oblique waves of light passing through the mask, and one or more of the final correction factors models oblique incidence effects.

9. A photolithography simulation system implemented by a computer, the system comprising:
    a three-dimensional mask model of a type of photolithography mask, the three-dimensional mask model comprising one or more of:
        a correction factor configured to modify a mathematical transform of a mask transmission function of a mask;
        a correction factor configured to modify a mathematical transform of a first mask-edge function corresponding to a first angle of orientation associated with the mask;
        a correction factor configured to modify a mathematical transform of a second mask-edge function corresponding to a second angle of orientation associated with the mask; and
        a correction factor configured to modify a mathematical transform of a mask-corner function of the mask,
        wherein the correction factors represent one or more effects of the topography of the type of photolithography mask on light passing through a mask of that type; and
    a software tool executed by the computer using the three-dimensional mask model to simulate a near-field image expected to be produced by a photolithographic tool using the type of photolithography mask.

10. The system of claim 9, wherein one or more of the correction factors is a function of polarization and incident angle of light.

11. The system of claim 9, wherein one or more of the correction factors is independent of the layout of a particular photolithography mask.

12. The system of claim 9, wherein one or more of the correction factors is calibrated to a theoretical simulated image such that a total difference between the theoretical simulated image and a simulated image produced using mask layout data and the three-dimensional mask model is minimized or below a threshold.

13. The system of claim 12, wherein the theoretical simulated image was produced by rigorously simulating the effects of a plane wave of light and oblique waves of light passing through a mask, such that each of the correction factors models oblique incidence effects.

14. The system of claim 9, wherein the type of photolithography mask is one of a group consisting of a binary mask and a phase-shifting mask.

15. The system of claim 9, wherein the three-dimensional mask model comprises a frequency-domain model.

16. The system of claim 9, wherein existing symmetry properties of one or more correction factors of the three-dimensional mask model are used to improve computational efficiency.

* * * * *